(12) United States Patent
Benavides

(10) Patent No.: US 7,309,408 B2
(45) Date of Patent: Dec. 18, 2007

(54) INDUSTRIAL WASTEWATER TREATMENT AND METALS RECOVERY APPARATUS

(75) Inventor: Alfonso Gerardo Benavides, 147 Wellwood, Corpus Christi, TX (US) 78410

(73) Assignee: Alfonso Gerardo Benavides, Plano, TX (US)

( * ) Notice: Subject to any disclaimer, the term of this patent is extended or adjusted under 35 U.S.C. 154(b) by 541 days.

(21) Appl. No.: 10/458,672

(22) Filed: Jun. 11, 2003

(65) Prior Publication Data

US 2004/0251199 A1    Dec. 16, 2004

(51) Int. Cl.
*C02F 1/469*    (2006.01)

(52) U.S. Cl. .................. 204/520; 204/275.1; 204/284; 204/630; 204/672; 205/771; 210/228; 210/231; 210/748

(58) Field of Classification Search ............... 210/120, 210/143, 188, 227, 228, 231, 243, 321.72, 210/634, 644, 649, 748, 749, 757, 758, 806, 210/767, 780; 204/252, 253, 258–266, 275, 204/278, 283, 284, 522–530, 633–639, 520, 204/630, 672, 273; 205/746–759, 771
See application file for complete search history.

(56) References Cited

U.S. PATENT DOCUMENTS

| | | | |
|---|---|---|---|
| 3,728,244 A | 4/1973 | Cooley | |
| 3,751,351 A | 8/1973 | Zankowski | |
| 3,936,363 A | 2/1976 | Fesseden | |
| 4,009,101 A | 2/1977 | Hayashi | |
| 4,420,401 A | 12/1983 | Kretas et al. | |
| 4,715,938 A * | 12/1987 | Billings | 205/629 |
| 4,832,804 A * | 5/1989 | Brattan | 205/516 |
| 4,894,128 A * | 1/1990 | Beaver | 205/513 |
| 5,093,007 A | 3/1992 | Domvile | |
| 5,102,522 A | 4/1992 | Rivers | |
| 5,139,664 A * | 8/1992 | Davis | 210/224 |
| 5,340,457 A | 8/1994 | Ford et al. | |
| 5,421,977 A * | 6/1995 | Getsy et al. | 204/263 |
| 5,529,672 A | 6/1996 | Barr et al. | |
| 5,565,107 A * | 10/1996 | Campen et al. | 205/688 |
| 5,587,064 A * | 12/1996 | Hambitzer et al. | 205/742 |
| 5,753,099 A | 5/1998 | Gravel et al. | |
| 5,873,986 A | 2/1999 | Thomson, III et al. | |
| 6,298,996 B1 * | 10/2001 | Spiegel et al. | 205/754 |
| 6,451,183 B1 | 9/2002 | Treasure et al. | |

OTHER PUBLICATIONS

Ludwig Hartinger, Handbook of Effluent Treatment and Recycling for the Metal Finishing Industry, 2nd Edition, 1994, pp. 314 to 394, Finishing Publications LTD USA.

* cited by examiner

*Primary Examiner*—Joseph Drodge

(57) ABSTRACT

An apparatus for industrial wastewater treatment and the electrolytic recovery of metals from solutions is disclosed. It comprises two or more plates with electricity conducting surfaces arranged in parallel and separated by insulating gaskets, two heads and a hydraulic ram or other mechanical means to press the group of plates between the heads. Plates and gaskets pressed together form chambers where metal recovery and other electrochemical reactions take place. Holes bored on the plates or on the gaskets separating them allow the solutions to flow in and out of the chambers. The solutions in the chambers close the electrical circuit between the conducting surfaces of the plates and allow an electrical current to flow from one plate to the other closing also a circuit between the terminals of an electrical current source. The apparatus can be easily manufactured by retrofitting a conventional filter press to perform electrochemical reactions assisting in the separation and partial decomposition of anions and cations and the recovery of metals by electrolysis. The gaskets between plates may form channel-like chambers of intricate flow path creating a high turbulence that permits oxidation and reduction reactions as well as electrolytic metal recovery to effected at a wide range of current densities.

20 Claims, 13 Drawing Sheets

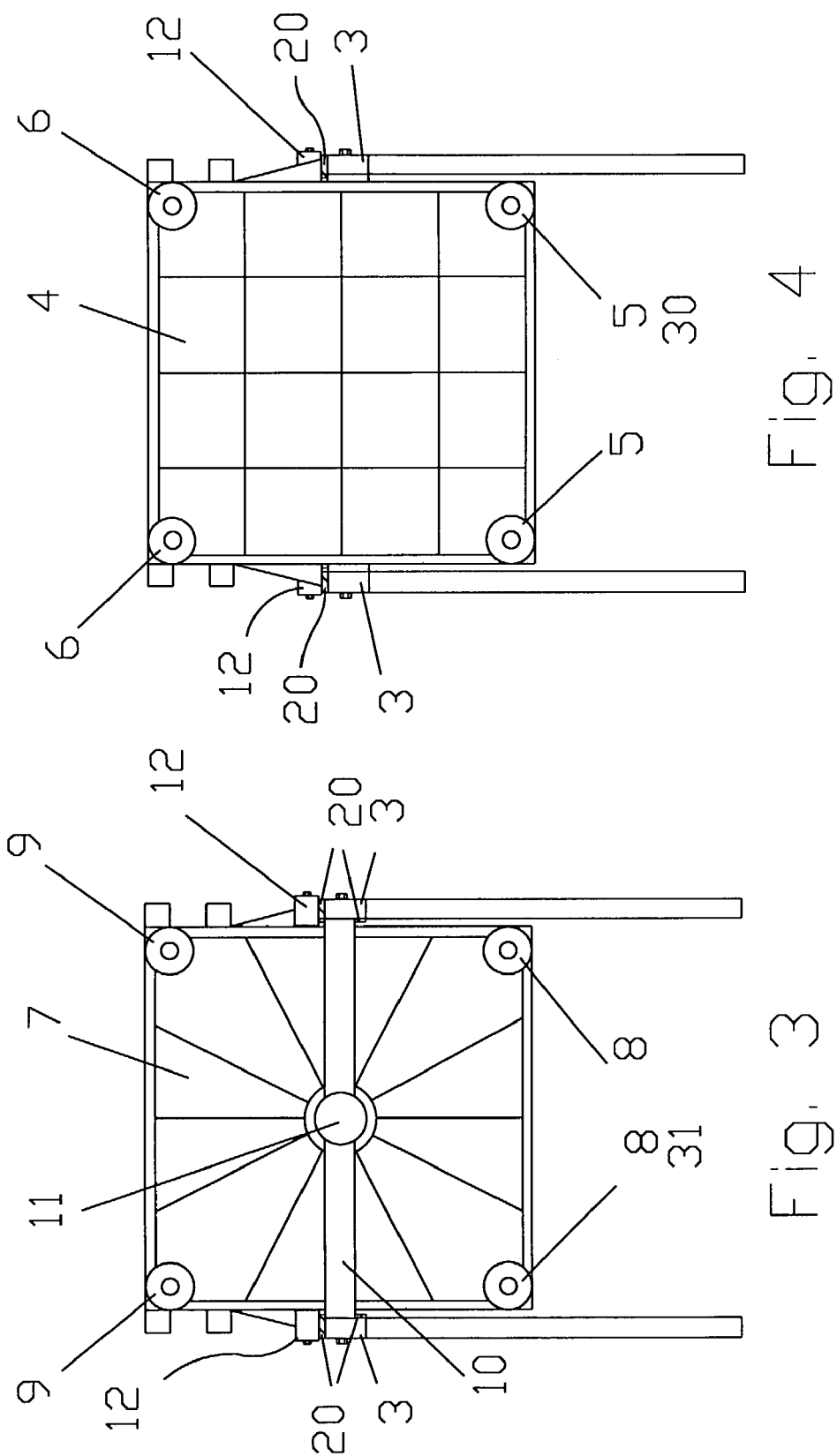

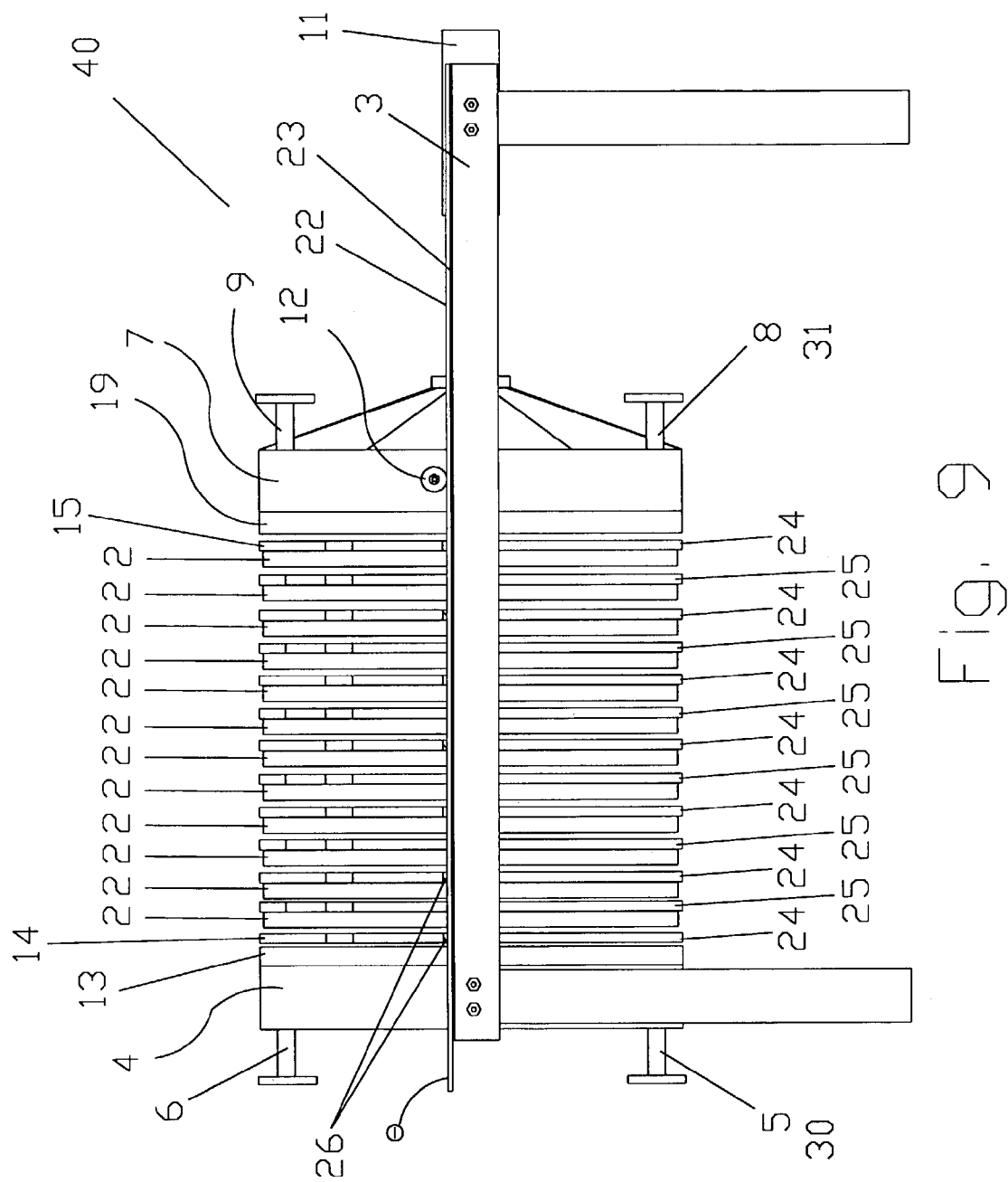

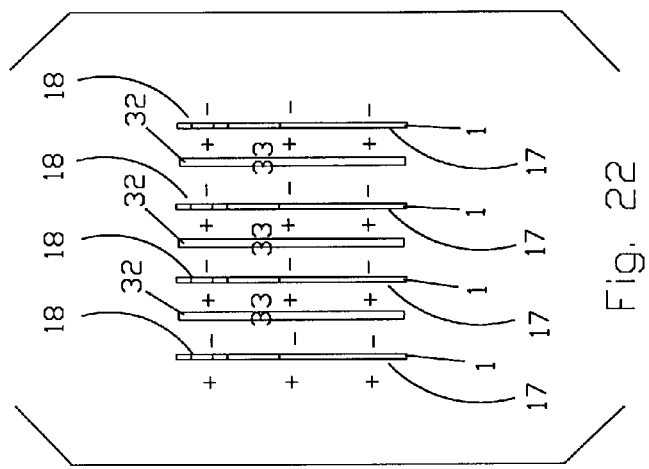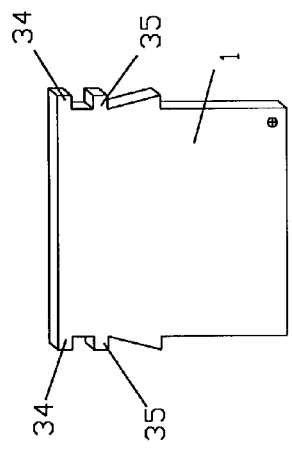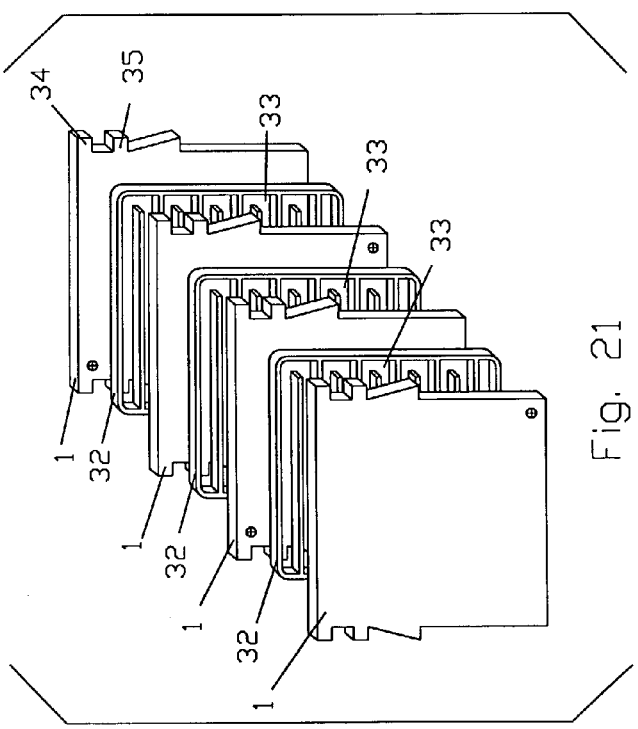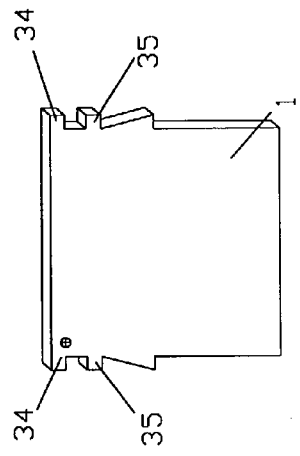

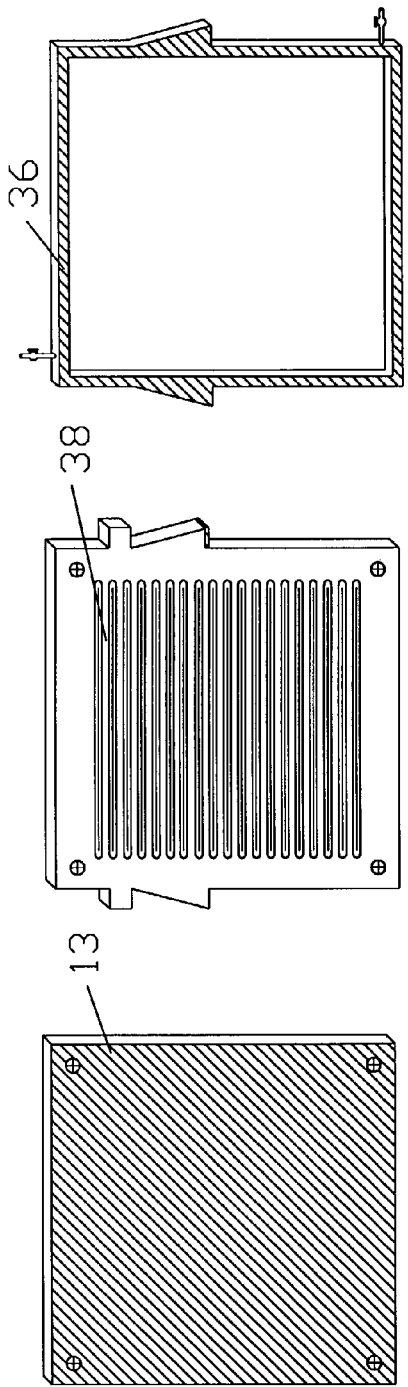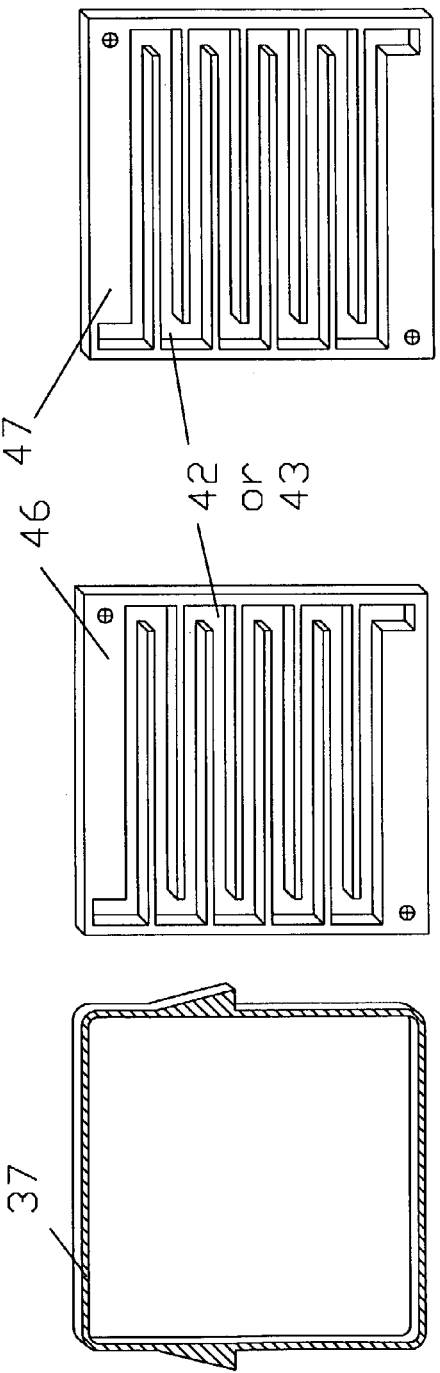

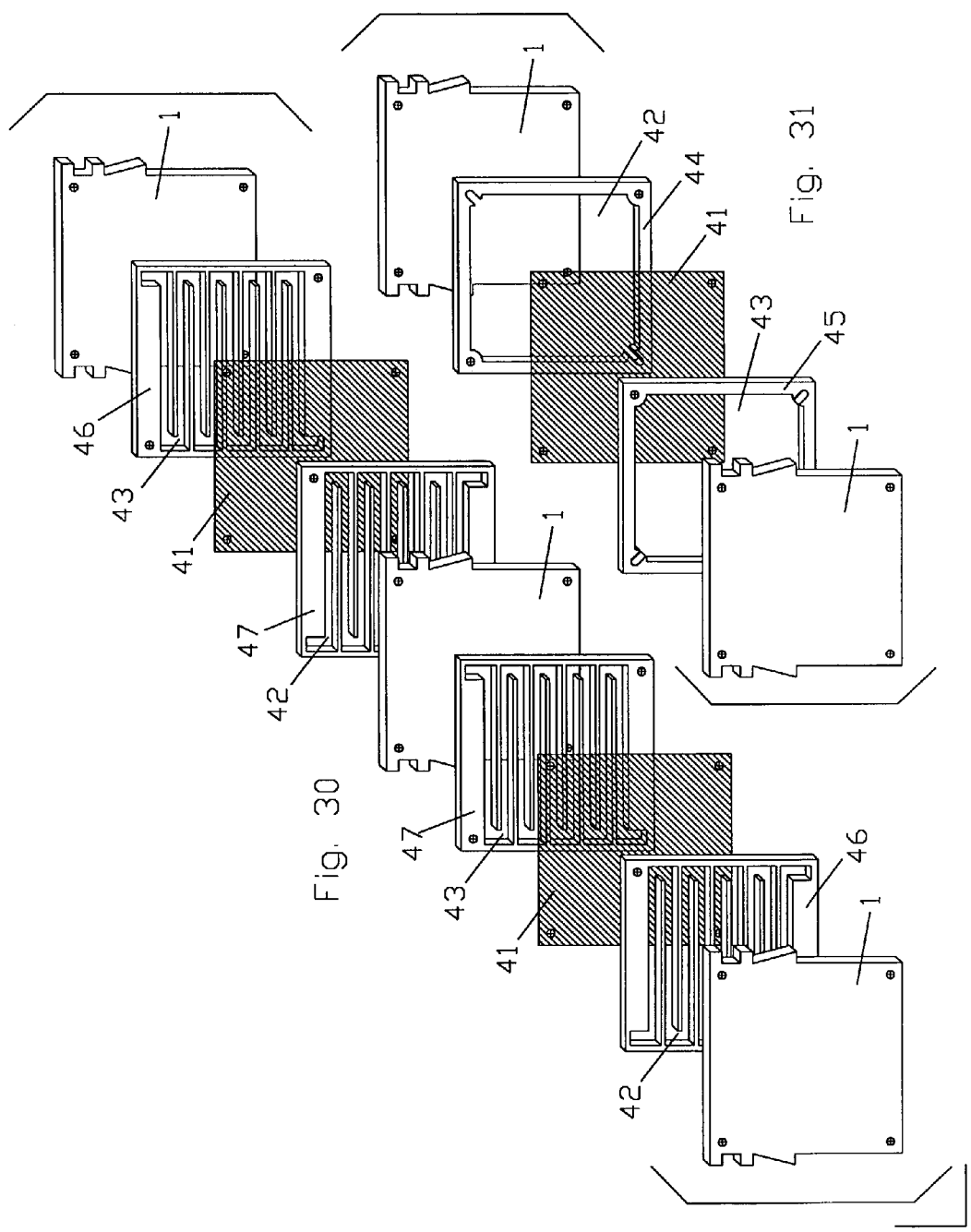

INDUSTRIAL WASTEWATER TREATMENT AND METALS RECOVERY APPARATUS

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

The apparatus relates to the separation of organic and inorganic substances from industrial wastewater assisted by electrochemical reactions.

The apparatus also relates to the recovery of noble and non-noble metals from solutions to be recovered as metallic deposits inside of the apparatus or as metallic particles suspended in one or more solutions leaving the apparatus.

Industrial wastewater treatment often involves separation of metals in solution, metal complexing agents, other anions and cations, oils, and reduction of COD.

Metals are ultimately separated by precipitation as hydroxides. Metal complexing agents have to be partially decomposed before one or more metals in solution can be removed. The decomposition of said complexing agents often involves oxidizing and reducing chemicals. Oxidizing chemicals are also used to partially decompose other anions and cations, organic matter and to lower the BOD and COD of the solution. Oil emulsions need to be broken by chemical and physicochemical reactions before they can be separated. Reducing chemicals are used to partially decompose anions and cations and to reduce Chromium from oxidation state 6+ to oxidation state 3+ rendering insoluble Chromium compounds.

Oxidizing chemicals are expensive and present handling and storage inconveniences. Reducing chemicals are also expensive and present similar inconveniences. A separate agitated vessel adequately sized and equipped is needed for each reaction that needs to take place. Flow-rate, addition of chemicals, and pH needs to be monitored and controlled in each vessel. Equipment is necessary to capture and manage any gases evolved from chemical decomposition reactions. Depending upon metal ion concentration and volume of wastewater to treat a substantial volume of metal hydroxide sludge could be generated presenting an additional handling, storage and disposal burden. The Handbook of Effluent Treatment and Recycling for the Metal Finishing Industry L Hartinger, pages 314-394 explains all the equipment frequently needed for continues and batch industrial wastewater treatment installations. U.S. Pat. Nos. 5,093,007, 4,420,401 and 4,009,101 are examples of industrial wastewater treatment schemes that also give an idea of all the equipment needed to treat a multiple contaminant aqueous effluent.

Recovery of a metal from an aqueous solution that contains ions of said metal by electrolysis involves immersing one or more positively charged electrodes (anodes) and one or more negatively charged electrodes (cathodes) in said solution and impressing across the electrodes of different polarity a direct current voltage of sufficient magnitude to effect migration of metal-ions and deposition of metal over the electrode surfaces.

It is well known that the efficiency of metal recovery by electrolysis from a solution is affected by factors like solution composition, temperature, metal-ion concentration, pH, and the level of agitation in the solution between anodes and cathodes. Anode and cathode surface characteristics, distance between anode and cathode, anode and cathode shape, anode and cathode surface composition, electrode arrangement and electric current profile also have influence over the efficiency of metal recovery from a solution.

It is well known that in Zinc, copper, nickel and other non-ferrous metals refineries around the world, the apparatus most widely used at industrial scale for metal recovery from a solution of its ions by electrolysis is what is mostly known as a 'liberator cell'. A liberator cell consists of an open top rectangular tank fitted with square flat anode and cathode plates disposed vertically face to face. The liberator cell is preferred because of its simplicity of design and low operation cost. Its open top tank configuration allows more than one electrode plate to be lifted from the cell in a single operation, the flat electrode plates are simple to manufacture and metal deposits over flat electrode plates are easy to strip. Electrodes handling and stripping operations are usually automated rendering high productivity with minimum labor. The liberator cell though has important drawbacks. Its design makes gas and acid mist emission control difficult, agitation in the cell is limited, and the cell has a low liquid specific velocity. The two later conditions limit the specific current density that can be applied through the cell. Therefore low current efficiencies and metal hydroxide deposits can be expected in the electrolysis of low metal ion concentration solutions and because metal hydroxides adhere poorly to the cathodes they fall to the bottom of the cell and periodic shut downs for cell cleaning are needed.

Examples of other metal recovery apparatuses patented over the years are U.S. Pat. Nos. 6,451,183, 5,873,986, 5,753,099, 5,529,672, 5,421,977, 5,340,457, 5,102,522, 3,936,363, 3,751,351, 3,728,244. Although each one displays unique features and capabilities, they are not meant for quick and easy opening and closing for metal removal and cleaning and except for U.S. Pat. No. 6,451,183 these designs are not meant for high production output with low labor utilization.

BRIEF SUMMARY OF THE INVENTION

The present invention consists of an array of parallel electrode plates separated by gaskets forming chambers where electrochemical reactions between electrode plates and the solution in contact with them take place. The pack of plates and gaskets is held together by a hydraulic press or other mechanical means.

As an industrial wastewater treatment apparatus the reaction chambers provide the electron exchange needed for oxidation and reduction chemical reactions without the need for oxidizing and reducing chemicals. Other electrically induced chemical and physicochemical reactions alter the structure of substances like polymers in solution and emulsified oils allowing these substances to form larger particles and droplets that are easier to flocculate and separate. The apparatus' chambers can be adapted for reagent injection or gas release. Anodes and cathodes can be made of corrosion resistant materials like stainless steel, titanium, etc; or made of sacrificial materials to keep the apparatus' construction and operation cost low and to supply materials for the chemical or physicochemical reactions taking place inside or outside the apparatus. Changing the size and shape of the gaskets between electrode plates can change the volume of the chambers. Permeable barriers placed between anode and cathode surfaces create anodic and cathodic chambers where different chemical reactions take place with their streams and products kept separated. Strong oxidizing agents can be generated in anode chambers and strong reducing agents can be generated in cathode chambers to be used in other chemical reactions inside or outside of the apparatus.

As a metals recovery apparatus the apparatus supplies the electrons to reduce metals ions to their zero oxidation state to be recovered in metallic form. The apparatus' design allows a high production output because of its fast and easy opening and closing and because several electrodes can be lifted at the same time for cleaning or scraping of deposited metal. Electrode plates are suitable for a metal scraping operation, which can be automated for a high production output operation. The apparatus is liquid and gas tight and it can be operated under internal liquid pressure allowing higher liquid velocities and therefore higher electrical current densities than liberator cell type metals electrolytic recovery apparatuses. Gases generated during the electrolysis are contained inside of the apparatus and can be conveyed to adequate venting. Reagents for pH control or to assist the electrolysis can be injected into any chamber. Various apparatuses can be arranged in series to reduce the process flow and therefore the size of the pumps needed to handle the solutions. The apparatus can be arranged with parallel or series electrical current flow, it can also be arranged with parallel or series liquid flow through the chambers between pairs of electrode plates. The apparatus can handle one or more different streams to recover or process one or more different materials. Its operation can be fully automated. Metal ions reduced in cathode chambers can be recovered as metal plated over the cathodes or as particles suspended in one or more of the solutions leaving the apparatus. Any single electrode plate can act as anode on one side and cathode on the other side.

One distinctive advantage of the present invention is that it can be easily manufactured by retrofitting a conventional filter press.

In accordance with this invention there is provided a novel apparatus for the separation and partial decomposition of organic and inorganic substances from wastewater and electrolytic recovery of metals from solutions assisted by electrochemical oxidation and reduction reactions as well as other electrically induced physicochemical reactions.

The apparatus subject of this claim exhibits the following advantages compared to prior art apparatuses:

The apparatus is a self-contained reactor where oxidation and reduction reactions can take place without the need for several agitated vessels.

The apparatus is of quick and easy opening and closing and its operation can be fully automated.

The apparatus is designed to be gas and liquid tight and dependant upon construction materials it can be operated at pressures up to 90 PSI and temperatures up to 90 degrees Celsius.

The apparatus' design permits masking of anode or cathode surfaces changing anode to cathode surface area ratio.

The series liquid flow configuration reduces the overall liquid flow through the apparatus therefore reducing the size of the feed pump required.

By changing the shape and thickness of gaskets between plates the volume of the chamber and the distance between electrode surfaces can be changed.

Sealing insulating frames can replace gaskets between plates.

The same apparatus can be operated in parallel liquid flow or series liquid flow by simply changing plates and gaskets.

Plates are easy to manufacture from sheets of a wide variety of materials available in various thicknesses.

Electrode plates can be made of a base material coated or lined with an electrically conductive material.

Electrode surfaces are easy to clean and deposited metal is easy to strip from their surfaces.

Electrode surfaces can be made corrugated to increase turbulence inside of the apparatus.

Spikes can be molded on or welded over electrode surfaces to induce localized plating and to produce metal buttons.

Simple addition or removal of electrode plates can modify the size and capacity of the apparatus.

The sealed design and the apparatus' capability of operating under internal pressure reduce the power requirements for any pump needed at the discharge end of the apparatus.

Because of its sealed design and capability of operating under internal pressure the apparatus can be drained quickly by blowing the solution out of it with compressed air or flushing it out with a solution or water.

Because of its low surface to volume ratio the apparatus has low heat losses and allows better temperature control.

The high liquid velocity and high liquid turbulence achieved in the apparatus permits high current efficiencies.

Addition of liquid chemicals is possible in any chamber by replacing a plate gasket by a reagent injection plate or reagent injection gasket. The high turbulence in the apparatus favors fast incorporation of reagents into the liquid streams.

Intermediate gas venting at various points through the apparatus is possible by introducing gas-venting gasket or gas-venting plates.

Several apparatuses can be arranged in parallel electrical flow or series electrical flow.

Several apparatuses can be arranged in parallel liquid flow or series liquid flow.

The apparatus' series flow arrangement requires a much smaller pump than an equivalent capacity liberator cell (the size of a pump motor is dependent on flow demand).

The apparatus' compact design has a much smaller footprint than a liberator cell of equivalent capacity.

The apparatus can be used to produce a solid deposit, a powdery deposit or a flaky deposit by changing operation conditions such as the electrode composition, the electrical specific current flow, the solution's specific volumetric flow, the solution temperature or the solution composition.

Weak deposits inside of the apparatus can be quickly and easily flushed out with water without having to open the apparatus. Other deposits can be easily scraped off or washed off the plates by opening the apparatus.

Electrical contacts are not in direct contact with process solutions therefore corrosion is minimized and it is not conductive to leaks.

The apparatus can be fabricated by a filter press manufacturer or by retrofitting conventional filter press parts and components.

Gaskets and frames are of simple manufacturing out of conventional materials.

Electrode plates can be fabricated with liberator cells anode and cathode manufacturing equipment and techniques or by retrofitting liberator cells' anodes and cathodes.

Equipment for liberator cell cathode lifting and handling can be used to lift and handle the apparatus' electrode plates.

Liberator cells' cathode stripping equipment can be used to strip metal from the apparatus' electrode plates.

The electrical circuit through the apparatus can be established in series or in parallel.

DESCRIPTION OF THE INVENTION

Figure 1:
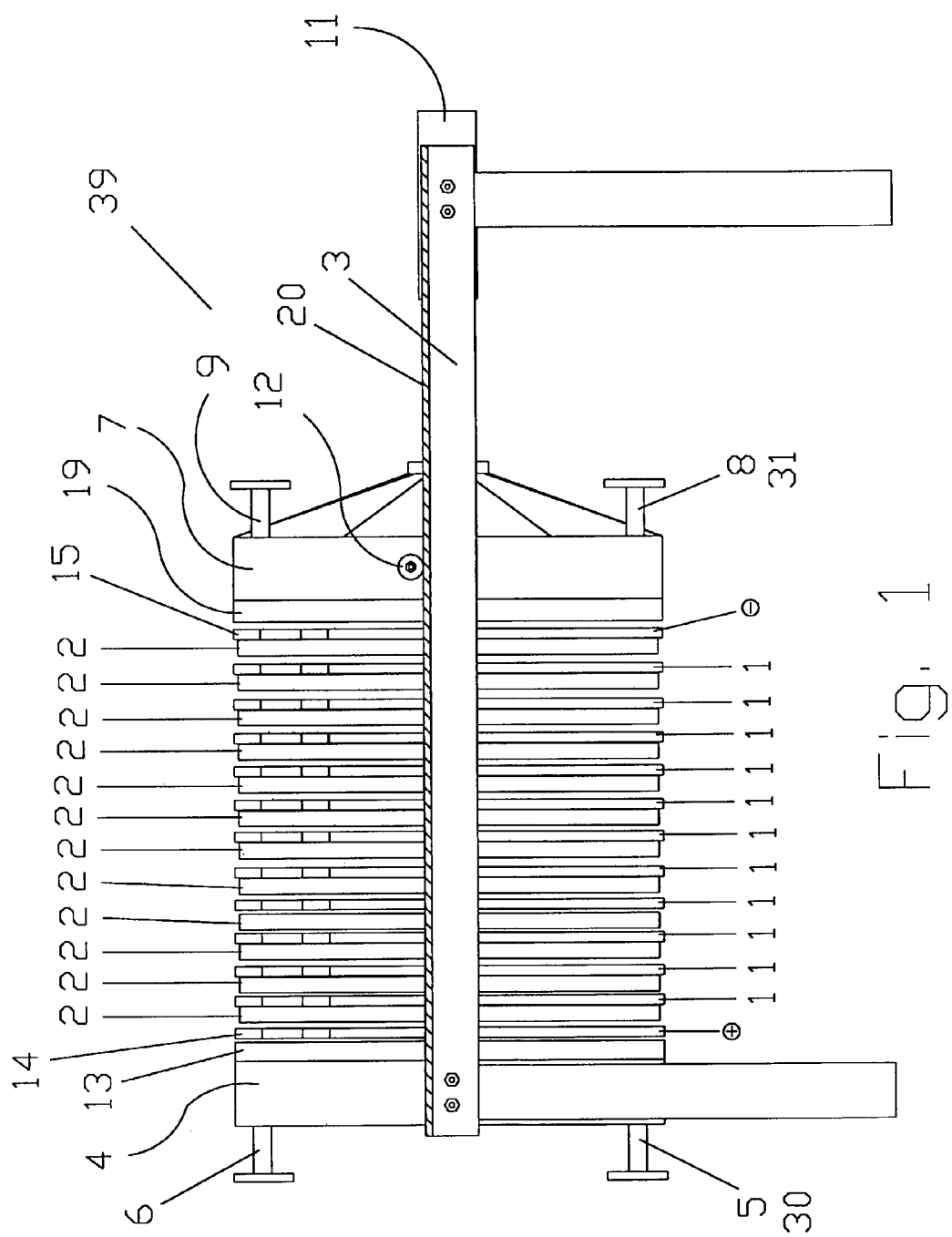
FIG. 1 Series electrical current flow electrolysis apparatus (side view)
FIG. 2 Series electrical current flow electrolysis apparatus (top view)
FIG. 3 Series electrical current flow electrolysis apparatus (back view)
FIG. 4 Series electrical current flow electrolysis apparatus (front view)
FIG. 5 Series electrical current flow with parallel liquid flow plate and hollow gasket arrangement (exploded view)
FIG. 6 Series electrical current flow with hollow gaskets
FIG. 7 Electrode plate for series electrical current flow with parallel liquid flow
FIG. 8 Hollow gasket
FIG. 9 Parallel electrical current flow electrolysis apparatus (side view)
FIG. 10 Parallel electrical current flow electrolysis apparatus (top view)
FIG. 11 Parallel electrical current flow electrolysis apparatus (back view)
FIG. 12 Parallel electrical current flow electrolysis apparatus (front view)
FIG. 13 Parallel electrical current flow with parallel liquid flow plates and hollow gaskets arrangement (exploded view)
FIG. 14 Parallel electrical current flow with hollow gaskets
FIG. 15 Cathode plate for parallel electrical current flow with parallel liquid flow
FIG. 16 Anode plate for parallel electrical current flow with parallel liquid flow
FIG. 17 Parallel electrical current flow with series liquid flow plates and intricate flow channel gaskets arrangement (exploded view)
FIG. 18 Parallel electrical current flow with intricate flow channel gaskets
FIG. 19 Split chamber gaskets
FIG. 20 Intricate flow channel gasket
FIG. 21 Series electrical current flow with series liquid flow plates and intricate flow channel gaskets arrangement (exploded view)
FIG. 22 Parallel electrical current flow with intricate flow channel gaskets
FIG. 23 Top corner hole plate for series electrical current flow with series liquid flow
FIG. 24 Bottom corner hole plate for series electrical current flow with series liquid flow
FIG. 25 Press head shielding plate with two inlets and two outlets
FIG. 26 Corrugated anode surface with two inlets and two outlets
FIG. 27 Reagent injection & gas venting gasket
FIG. 28 Hollow insulating gasket
FIG. 29 Split chamber gaskets with intricate flow channel
FIG. 30 Series current flow with parallel liquid flow split chamber intricate flow channel gaskets arrangement (exploded view)
FIG. 31 Series current flow with parallel liquid flow split chamber hollow gaskets arrangement (exploded view)
FIG. 32 Series current flow with series liquid flow split chamber intricate flow channel gaskets arrangement (exploded view)
Figure 2:
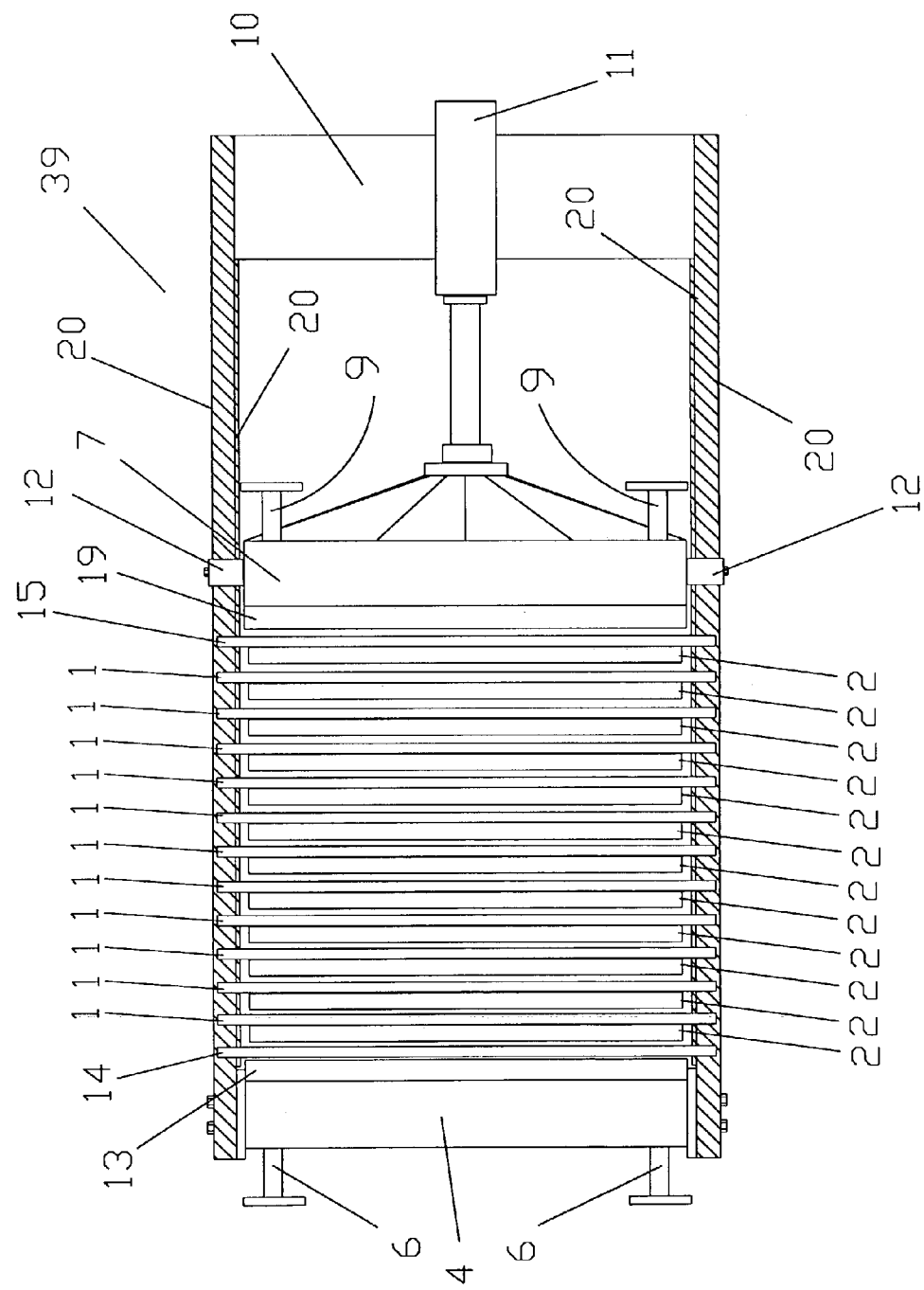
Figure 6:
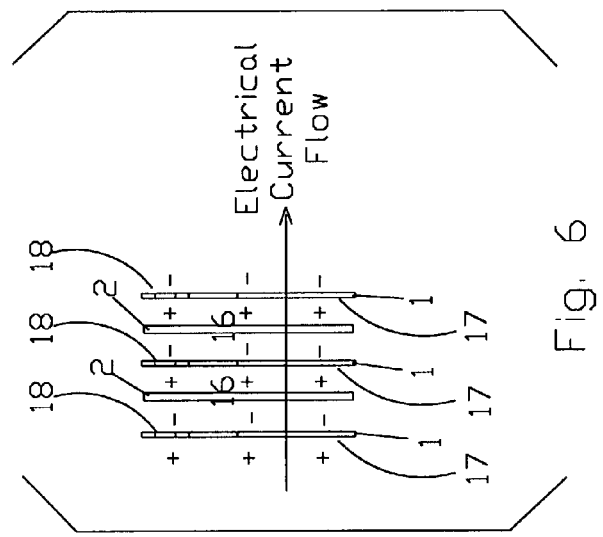
Figure 8:
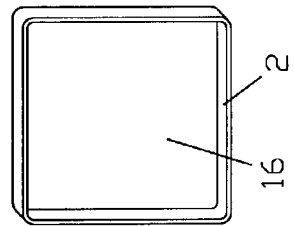
Figure 5:
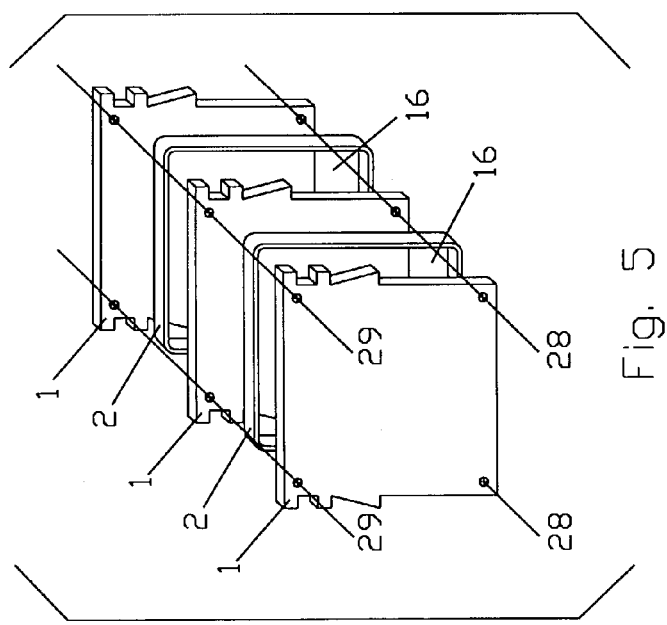
Figure 7:
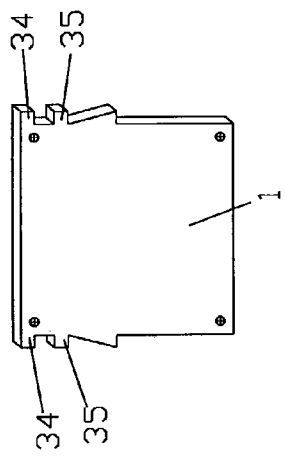
Figure 10:
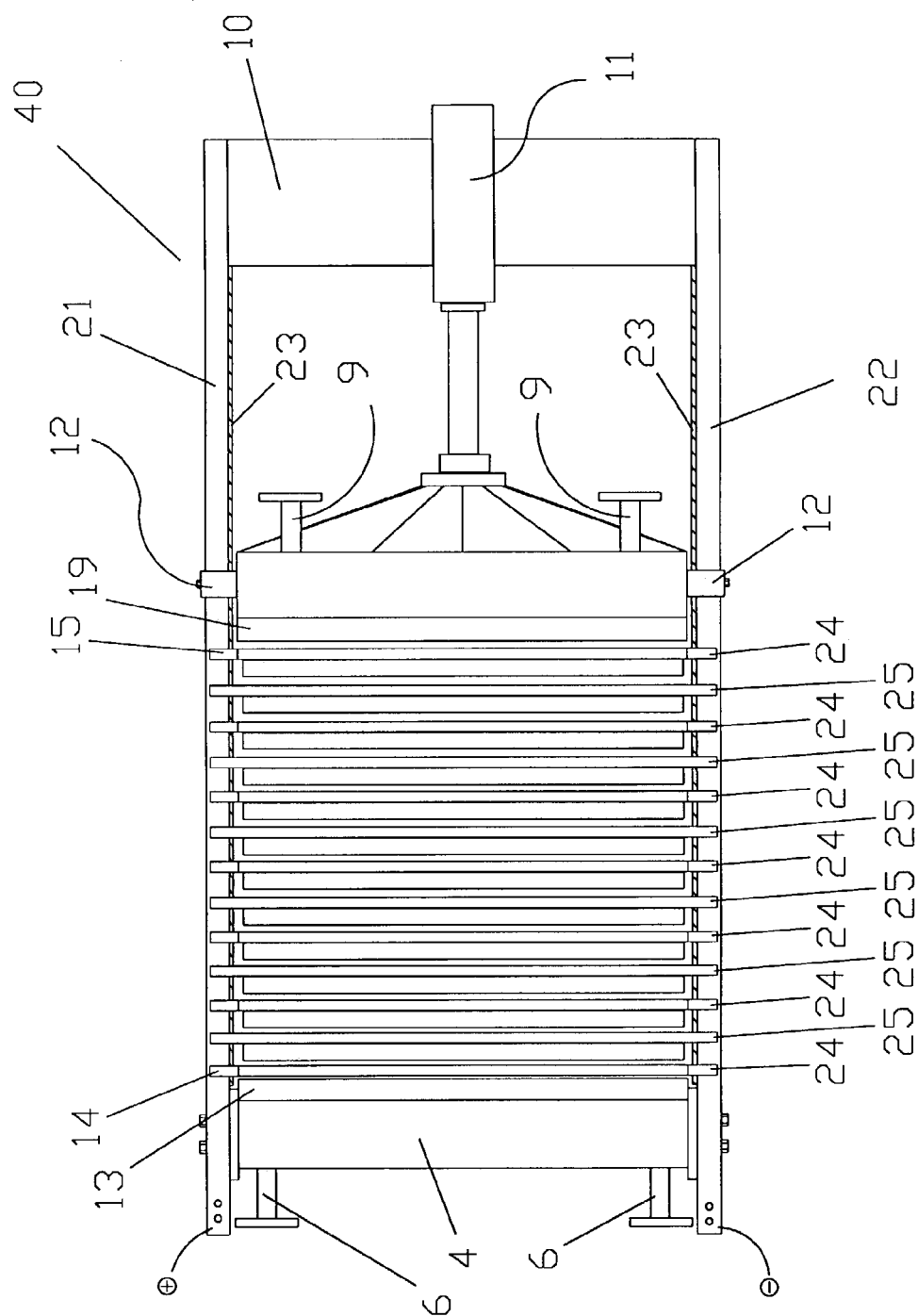
Figure 12:
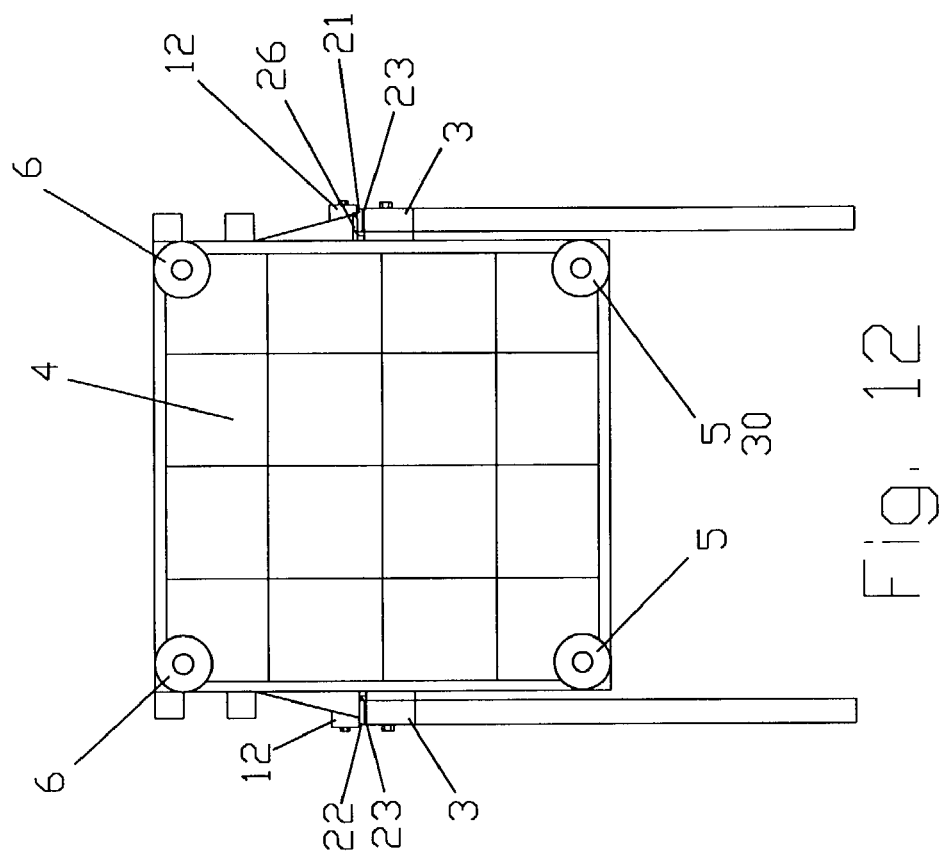
Figure 11:
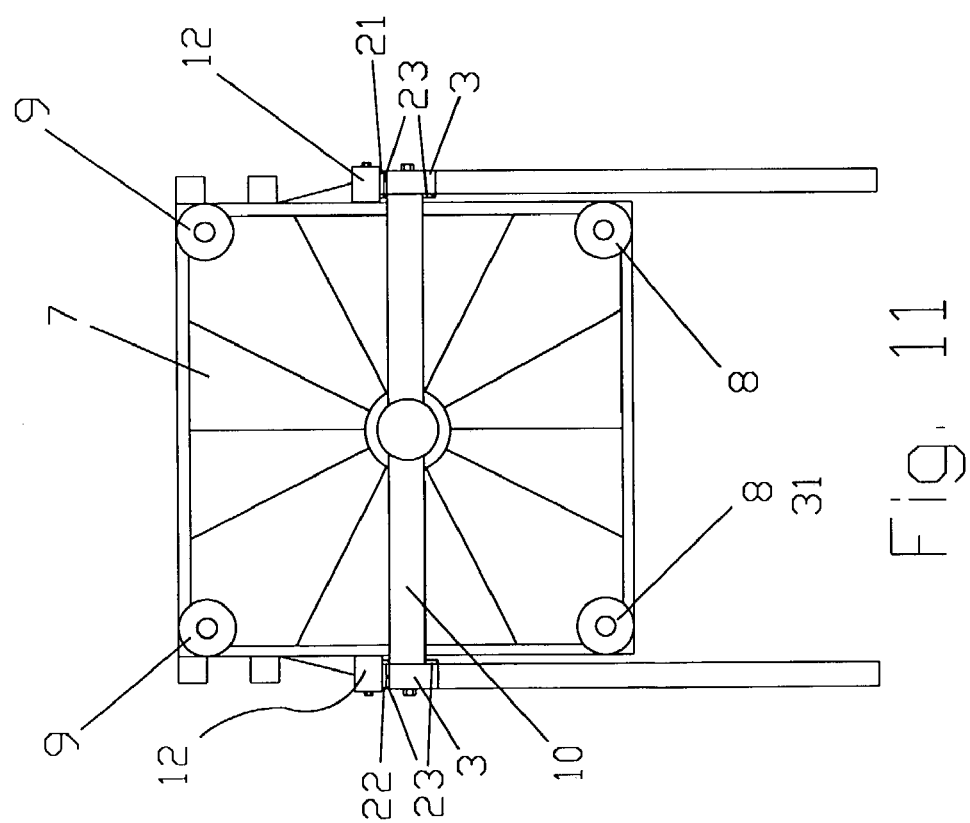
Figure 14:
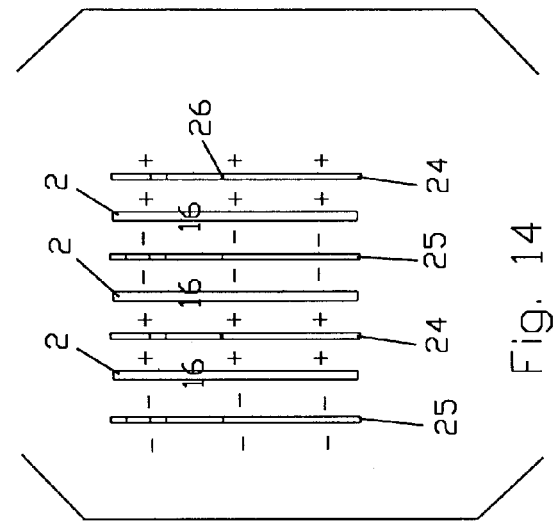
Figure 13:
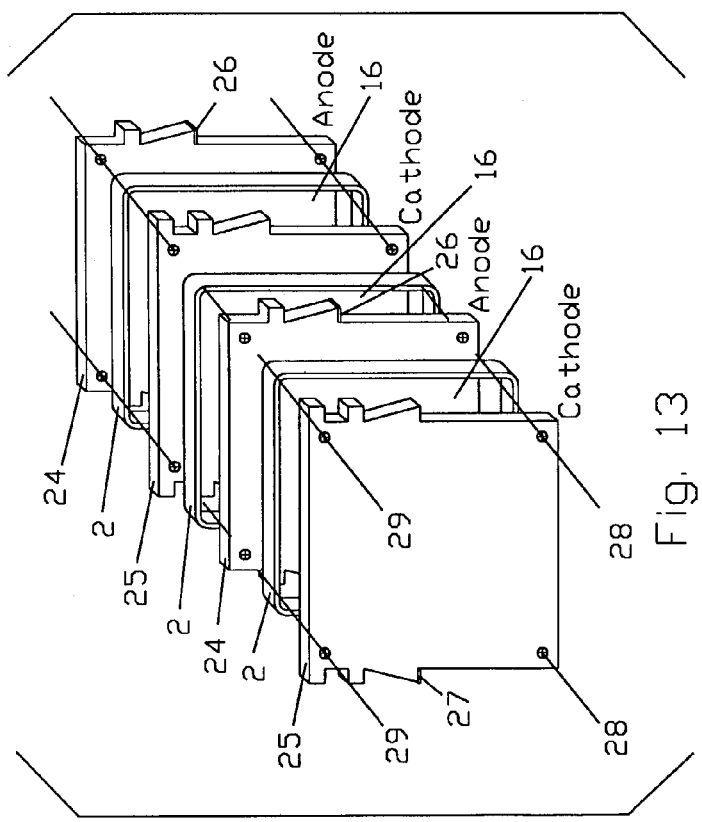
Figure 16:
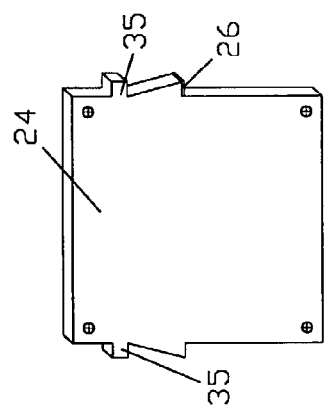
Figure 15:
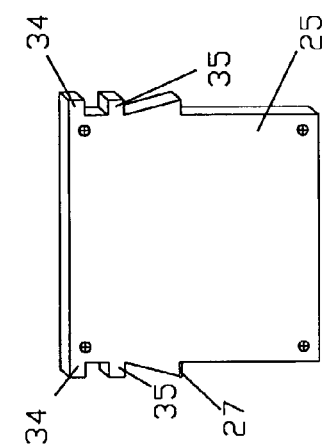
Figure 18:
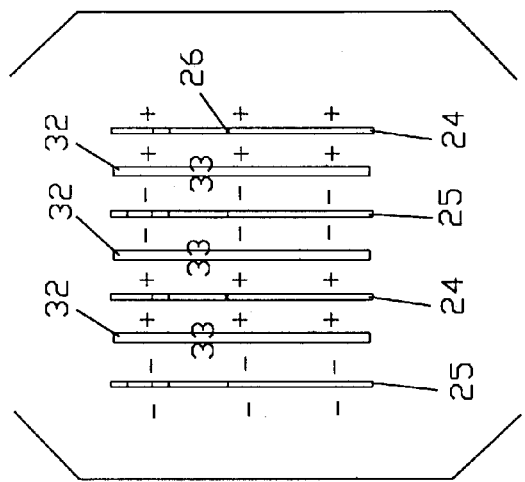
Figure 20:
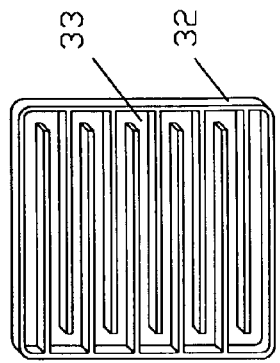
Figure 17:
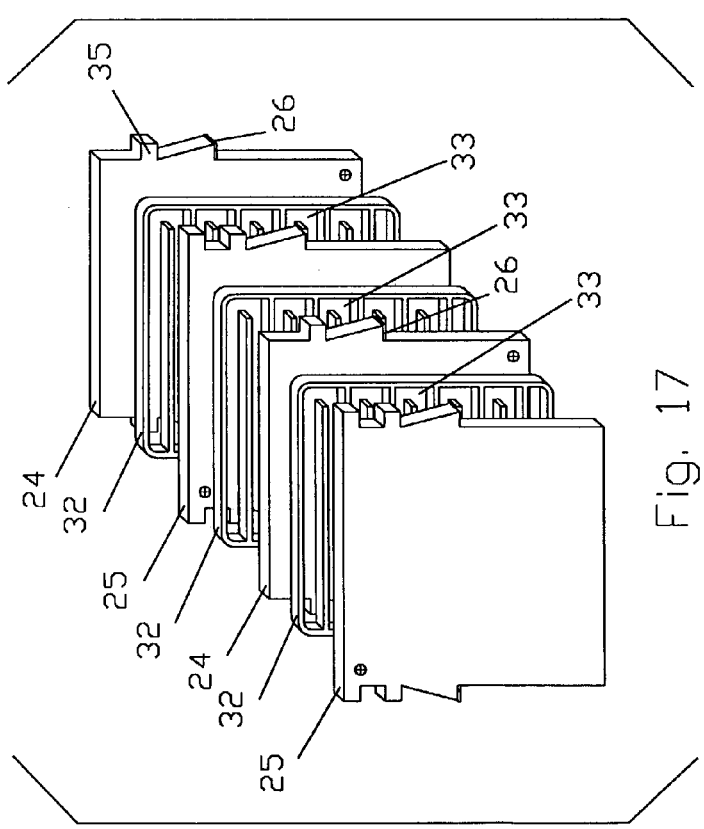
Figure 19:
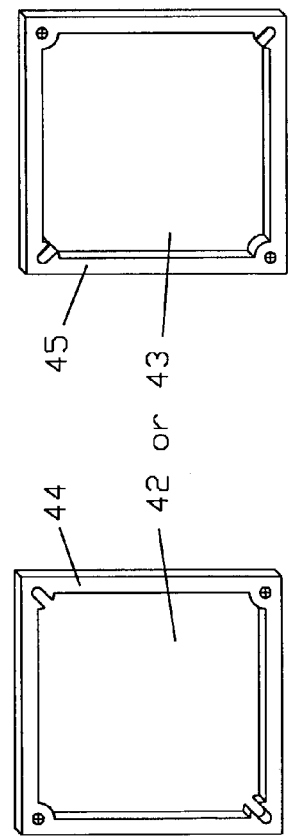

The apparatus (39) comprises a group of electrode plates preferably flat and square (1) arranged in parallel in face-to-face positions separated by gaskets (2) and hung on one or more parallel horizontal support bars (3), a press head preferably stationary (4) fixed to the support bars (3) that can be provided with one or more ports for solution inlet pipe or pipes (5) to the apparatus (39) and one or more ports for the solution outlet pipe or pipes (6) from the apparatus (39), a follower press head (7) that can also be provided with one or more ports for the solution inlet pipe or pipes (8) to the apparatus (39) and one or more ports for the solution outlet pipe or pipes (9) from the apparatus (39), a support bracket (10) fixed to the support bar or bars (3) on the opposite end from the stationary press head (4) and a hydraulic ram (11) or other mechanical means to displace and press the follower press head (7) and electrode plates (1) and gaskets (2) together and against the stationary press head (4).

The parallel support bars (3) can serve as railings for electrode plates (1) and for the follower press head (7) that can be mounted on rollers (12). An electrically insulating or shielding plate (13) is placed between the stationary press head (4) and the first electrode plate (14). Electrode plates (1) and gaskets (2) are alternated thereafter throughout the apparatus (39) from the stationary press head (4) to the follower press head (7). Each gasket (2) installed to seal along the periphery of a pair of electrode plates (1) facing each other and pressed between them forms an electrochemical reaction chamber (16). The arrangement of alternating electrode plates (1) and gaskets (2) creates a multitude of electrochemical reaction chambers (16) through which the solution can be made to flow following various paths. On the other end of the apparatus (39) another shielding plate (19) is placed between the last electrode plate (15) and the follower press head (7).

Any chamber formed by two electrode surfaces separated by a gasket can be further subdivided into two different kinds of chambers by placing a permeable barrier (for example a filter cloth or an ion exchange membrane) (41) that will allow limited flow of chemical species from one side to the other of said permeable barrier. The chamber formed by an electrode surface acting as an anode a gasket and a permeable barrier is an anodic chamber (42). The chamber formed by an electrode surface acting as a cathode a gasket and a permeable barrier is a cathodic chamber (43). The permeable barrier allows electron exchange between anodic and cathodic chamber and a limited exchange of chemical species from one side of the barrier to the other.

Electrochemical reactions take place inside of each chamber (16) (33) (42) (43) where the electrode surfaces provide the electron exchange necessary for the physicochemical and chemical reactions leading to the separation, oxidation and reduction of substances in solution or emulsion as well as changing the metal ions' oxidation state. Because a permeable barrier does not act as an anode or as a cathode, oxidation reactions taking place over and in the vicinity of anode surfaces can be isolated from reduction reactions taking place over and in the vicinity of cathode surfaces. Therefore only anodic reactions take place in anodic chambers and only cathodic reactions take place in cathodic chambers.

Electrical current in the apparatus can be arranged to flow through the chambers in parallel or in series.

In a series electrical current flow arrangement, one direct current source terminal (the positive terminal for example) is connected only to the first electrode plate (14) at one end of a pack of electrode plates in the apparatus (39) and the other direct current source terminal (the negative for example) is connected only to the last electrode plate (15) at the other end of the pack of plates in the apparatus (39). The direct current flows through all electrode plates (1) and chambers (16) from one end of the pack to the other. As electricity flows through each chamber (16), each electrode plate (1) absorbs electrons through one face acting as an anode surface (17) to a chamber, and supplies electrons through the other face acting as a cathode surface (18) to the chamber in the other side of the electrode plate. Plate support bars (3) are insulated from all the electrode plates (1) by means of an electric insulator (20).

In a parallel electrical current flow arrangement, the support bars (3) support a positive bus bar (21) and a negative bus bar (22). Electrode plates hung on the support bars are in electrical contact with one bus bar and electrically insulated from the other. The direct current source positive terminal is connected through a positive bus bar (21) to every other electrode plate from one end to the other of the pack of plates arranged to operate with parallel electric flow. The direct current source negative terminal is connected through a negative bus bar (22) to the remaining electrode plates (25) in the pack. Electrode plates in electrical contact with the positive bus bar (21) become anode plates (24) and both faces of said plates act as anode surfaces (17). Electrode plates in electrical contact with the negative bus (22) bar become cathode plates (25) and both faces of said plates act as cathode surfaces (18). Anode plates (24) are insulated from the negative bus bar (22) by means of a shoe insulator (26). Cathode plates (25) are insulated from the positive bus bar (21) by means of a shoe insulator (27).

Follower head (7) and support bars (3) are insulated from the positive bus bar (21) and the negative bus bar (22) as well as from the side edges of the anode plates (24) and the side edges of the cathode plates (25) by means of an electric insulator (23). Anode plates (24) and cathode plates (25) are alternated from the stationary shielding plate (13) to the follower shielding plate (19). The first electrode plate (14) and the last electrode plate (15) are preferred to be anode plates (24) so that metal would not plate over them allowing them to have a better seal against the stationary shielding plate (13) and the follower shielding plate (19).

In both parallel and series electrical flow arrangements, anode surfaces (17) completing the electrical circuit with cathode surfaces (18) through the solution will release oxygen and will be subject to oxidizing by said released oxygen. Metal anode surfaces (17) completing the electrical circuit with the cathode surfaces (18) through the solution can suffer galvanic corrosion, releasing metal from its surface into the solution. Anode surfaces (17) therefore need to be resistant to said forms of corrosion in addition to being resistant to the corrosiveness of the solution in contact with them. Lead anode plates (24) or Titanium base metal anode plates (24) with a Ruthenium Oxide or Iridium Oxide coating are common.

The series electrical flow arrangement presents advantages and disadvantages against the parallel electrical flow arrangement. In the series electrical arrangement each electrode plate (1) will have one face acting as anode (17) and the opposite face acting as cathode (18). Such electrode plate (1) is difficult to manufacture and handle. The parallel electrical flow arrangement uses anode plates (24) and cathode plates (25) and both faces on each type of electrode plate can be made of the same material with the same coating. On the other hand, the parallel electrical flow arrangement requires an electrical power supply capable of delivering a current equivalent to the required current per chamber (16) (33) times the number of said chambers at the average voltage drop per chamber, whereas the series electrical flow arrangement requires an electrical power supply capable of delivering a current equivalent to one time the required current per chamber (16) (33) at the voltage drop equivalent to the average voltage drop per chamber times the number of said chambers. Therefore the parallel electrical flow arrangement apparatus (40) requires a power supply more expensive to manufacture and operate than the unit required for a series electrical flow arrangement apparatus (39). All electrical components for a parallel electrical flow arrangement need to be rated for much higher currents than the components needed for a series electrical flow arrangement. This also makes the parallel electrical flow arrangement more expensive. The series electrical current flow arrangement allows the voltage drop through each individual chamber (16) (33) to be measured. The parallel electrical current flow arrangement allows the current flow through each individual chamber (16) (33) to be measured.

Liquid circulation in the apparatus (39) (40) can also be arranged to flow through the chambers (16) (33) (42) (43) in parallel or in series.

In a parallel liquid flow arrangement, the alignment of holes bored perpendicular to the electrode plate face in bottom locations in all electrode plates (1) anode plates (24) and cathode plates (25) forms continuous longitudinal channels (28) from the stationary press head (4) to the follower press head (7). These channels would preferably be used to convey solutions into the apparatus (39) (40). The alignment of holes bored perpendicular to the electrode plate face in top locations in all electrode plates (1) or anode plates (24) and cathode plates (25) form continuous longitudinal channels (29) from the stationary press head (4) to the follower press head (7). These channels would preferably be used to convey solutions out of the apparatus (39) (40). Inlet pipes (5) passing through ports in the bottom of the stationary press head (4) connect to the stationary shielding plate (13), and inlet pipes (8) passing through ports in the bottom of the follower press head (7) connect to the follower shielding plate (19). Inlet pipes (5) (8) communicate with the bottom longitudinal channels (28). The solutions entering the apparatus (39) (40) through the bottom pipes (5) (8) would irrigate the bottom longitudinal channels (28) that in turn communicate through the lower corners with the chambers (16). Outlet pipes (6) passing through ports in the top of the stationary press head (4) connect to the stationary shielding plate (13), and outlet pipes (9) passing through ports in the top of the follower press head (7) connect to the follower shielding plate (19). Outlet pipes (6) (9) communicate with the top longitudinal channels (29). The solution exiting the apparatus (39) (40) through these outlet pipes (6) (9) would come from the top longitudinal channels (29) collecting the solutions exiting through the top corners of the chambers (16). Inlet pipes (8) and outlet pipes (9) connected to the follower press head (7) are connected with hoses to the supply and return of solution respectively.

When permeable barriers are used to create anodic chambers (42) and cathodic chambers (43), it is often desired to maintain the liquid stream circulating through anodic chambers separated from the liquid stream circulating through cathodic chambers. This can be accomplished by means of split chamber gaskets (44) (45) that would force a liquid stream to flow through every other chamber only commingling with liquid flowing through the same kind of chambers. Split chamber gaskets with flow channels (46) (47) are used when high liquid flow velocity is desired to increase the turbulence at the vicinity of anode and cathode electrode surfaces. Anodic and cathodic solutions are only in contact with each other through the permeable barrier for electron exchange and a limited exchange of chemical species. FIG. 30 depicts the anode, permeable barrier, and cathode arrangement for a series electric flow with parallel liquid flow scheme. Intricate flow channel gaskets (46) (47) convey liquids from one corner to the opposite located diagonally across keeping the liquid conveyed through anodic chambers separated from the liquid conveyed through cathodic chambers. The same intricate flow channel gaskets (46) (47) can be used with a different arrangement for a parallel electric flow with parallel liquid flow scheme.

In a series liquid flow arrangement, a group of chambers (16) in the apparatus (39) (40) would have only one inlet and one outlet. In a typical arrangement the inlet pipe (30) is connected to the stationary shielding plate (13) through a port in the stationary press head (4) and an outlet pipe (31) is connected to the follower shielding plate (19) through a port in the follower press head (7). Only one hole is bored in each electrode plate (1) (24) (25) perpendicular to the electrode plate (1) (24) (25) face in the top or in the bottom. The electrode plates (1) (24) (25) with top or bottom hole are alternated from the stationary shielding plate (13) to the follower shielding plate (19). A gasket (2) (32) pressed between two electrode plates (1) or between an anode plate (24) and an cathode plate (25) forms an electrolysis chamber (16) (33) but in this arrangement each gasket (32) forms a channel of intricate flow path (33) connecting each chamber's inlet with its outlet. The outlet of one chamber (33) becomes the inlet of the next chamber (33) through the hole bored in the electrode plate (1) (24) (25) serving as division wall between both chambers (33). The solution entering the apparatus (39) (40) through the inlet pipe (30) passes through the stationary press head (4), the stationary shielding plate (13) and the bottom hole of the first electrode plate (14) into the first chamber (33). Then the solution flows upward through the channel (33) between the first and second electrode plates (1) (24) (25) to exit through the top hole in the second electrode plate (1) (24) (25) into the second chamber (33). The solution exiting the first chamber (33) flows downward through the channel (33) between the second and the third electrode plates (1) (24) (25) to exit through the bottom hole in the third electrode plate (1) (24) (25) into the third chamber (33). This pattern is repeated from the stationary shielding plate (13) to the follower shielding plate (19) where the solution passes through the bottom hole in the last electrode plate (1) (24) (25), the follower shielding plate (19) to exit the apparatus (39) (40) through the bottom corner outlet pipe (31) in the follower press head (7).

Figure 32:
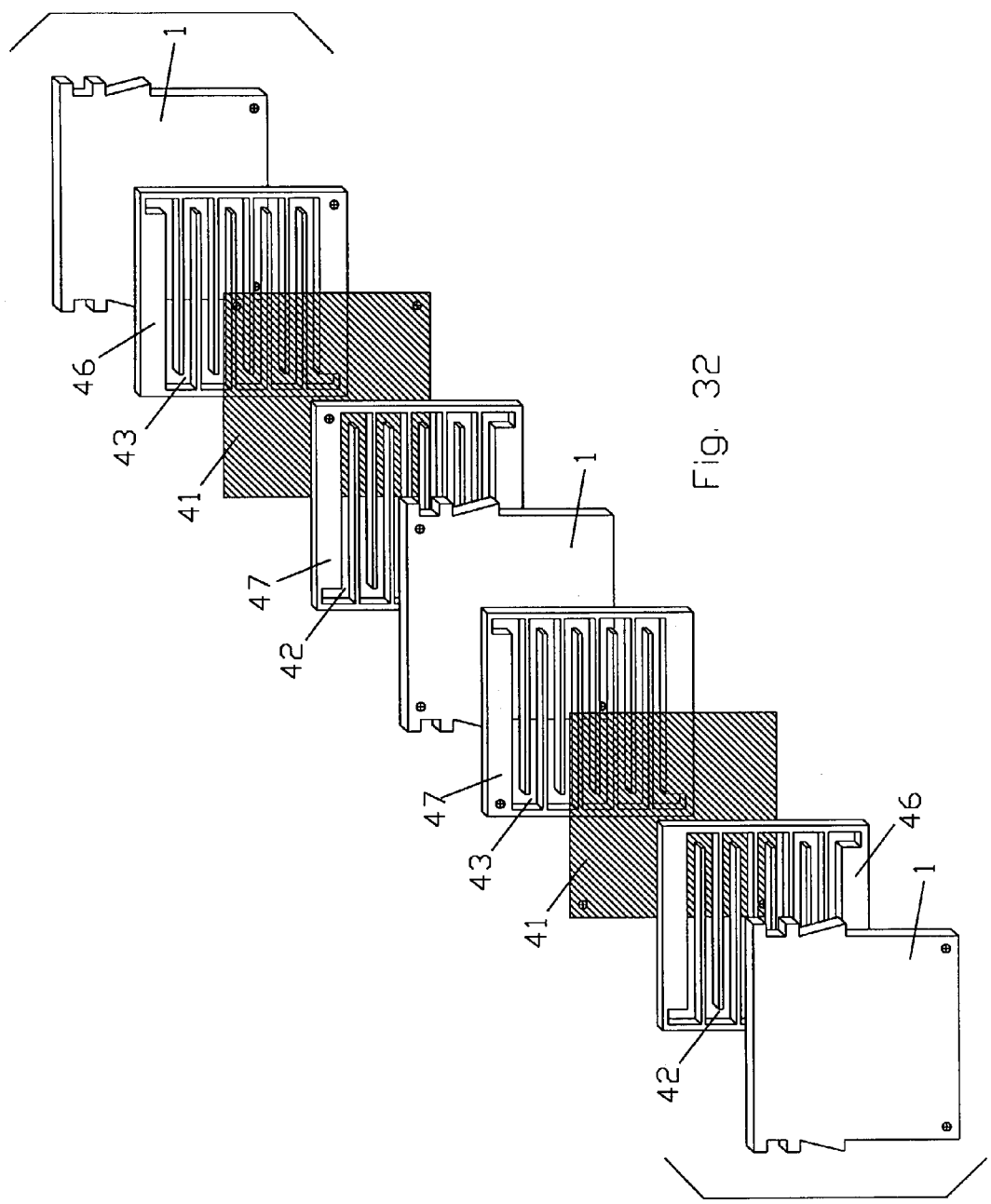

When permeable barriers are used in a series liquid flow arrangement to create anodic chambers (42) and cathodic chambers (43) split chamber gaskets (44) (45) and split chamber gaskets with intricate flow channel (46) (47) are also used to maintain the liquid stream circulating through anodic chambers separated from the liquid stream circulating through cathodic chambers. In this case the liquid flow is arranged in series simply by forcing all the liquid from one stream to flow through all the anodic or all the cathodic chambers in the group of chambers. FIG. 32 depicts a series electric flow with series liquid flow and split chamber intricate flow channel gaskets arrangement. The solution flowing through an anodic chamber in an upward direction then flows in a downward direction through the next anodic chamber. The solution flowing through a cathodic chamber in a downward direction then flows in an upward direction through the next chamber. Anodic and cathodic solutions are only in contact with each other through the permeable barrier for electron exchange and a limited exchange of chemical species.

Greater solution turbulence is created in the apparatus (39) (40) by inducing a high velocity flow through the intricate flow path channel (33) in every chamber (33), promoting agitation over the electrode plates' faces exposed to the solution.

Parallel and series electrical flow can be combined with parallel and series liquid flow in the same apparatus (39) (40) by simple modifications made to the electrode plates (1), anode plates (24), cathode plates (25) and gaskets (2) (32) (44) (45) (46) (47).

Cathode plates (25) can be provided with top lugs (34) to be lifted without lifting the anodes. Both anode (24) and cathode plates (25) can be provided with lower lugs (35) to be lifted in a single operation.

Electrode plates (1) having one face acting as an anode (17) and another face acting as a cathode (18) have both top lugs (34) and bottom lugs (35) to be lifted together. Said electrode plates (1) do not need shoe insulators since the support bars (3) in the series electrical flow arrangement are covered with insulator (20). Cathode surfaces (18) in all of such electrode plates (1) may need to be scraped for metal recovery.

A reagent injection and gas venting gasket (36) can be installed replacing a regular gasket anywhere in the pack of electrode plates (1) (24) (25) and gaskets (2) (32) with series liquid flow arrangement. Said gasket (36) can be used to add reagents to be consumed in subsequent chambers (16) (33) or vent the gases produced in the chambers (16) (33) upstream of it.

Hollow frames can replace gaskets (2) (32) where greater rigidity of the insulating elements between electrode plates (1) (24) (25) is needed.

A corrugated anode surface (38) can replace a flat anode surface (17) to promote turbulence between the anode surface (17) and the cathode surface (18) and improve plating efficiency.

A cathode surface with spikes can replace a flat cathode surface (18) to induce localized plating and form nodules or buttons instead of a sheet like deposit.

PARTS LIST

1 Electrode plate with one face acting as anode and the opposite face acting as cathode
2 Hollow gasket
3 Support bar
4 Stationary press head
5 Stationary press head inlet pipe
6 Stationary press head outlet pipe 7 Follower press head
8 Follower press head inlet pipe
9 Follower press head outlet pipe
10 Support bracket
11 Hydraulic ram
12 Follower press head roller
13 Stationary press head shielding plate
14 First electrode plate in the apparatus
15 Last electrode plate in the apparatus
16 Electrolysis chamber created by a hollow gasket pressed between electrode plates
17 Electrode surface acting as anode
18 Electrode surface acting as cathode
19 Follower press head shielding plate
20 Electric insulator
21 Anode bus
22 Cathode bus
23 Electric insulator
24 Anode plate
25 Cathode plate
26 Anode shoe insulator
27 Cathode shoe insulator
28 Bottom longitudinal channel
29 Top longitudinal channel
30 Series liquid flow arrangement inlet pipe
31 Series liquid flow arrangement outlet pipe
32 Gasket with intricate flow channel
33 Electrolysis chamber created by a intricate flow channel gasket pressed between electrode plates
34 Electrode plate top lifting lug
35 Electrode plate bottom lifting lug
36 Reagent injection gas venting plate
37 Hollow gasket
38 Corrugated anode surface
39 Series electrical current flow apparatus
40 Parallel electrical current flow apparatus
41 Permeable barrier
42 Anodic chamber
43 Cathodic chamber
44 Split chamber hollow gasket
45 Split chamber hollow gasket
46 Split chamber gasket with intricate flow channel
47 Split chamber gasket with intricate flow channel

I claim:

1. The electrolytic cell of the filter press type for wastewater treatment and metals recovery from solutions of their salts comprising:
   a) Two horizontal parallel bars to align and support plates and gaskets,
   b) Two or more square electrode plates arranged perpendicular to the support bars and hanging on said support bars by means of ears extending horizontally from the vertical sides of said plates, said plates to be lifted from the apparatus by a crane or other suitable means when needed to be cleaned or replaced, said plates non permeable, said plates with electricity conducting faces to act as anodes and/or cathodes in contact with the liquid or liquids being treated, said cathode faces with a surface suitable for electrochemical depositing of metals over them, said electric conducting faces electrically connected directly or indirectly to a terminal of a electric power supply, said plates with one or more openings for the liquids, gases and reagents to pass through them and enter or exit the chambers formed between plates,
   c) A split chamber gasket placed between every pair of plates and following the contour of the plates it is set against, each gasket to be compressed between two plates, the two plates and the gasket forming a chamber having intricate flow channels configured to convey liquids from one corner of the gasket to the diagonal, opposite corner of the gasket where metal recovery by electrowinning as well as other electro-chemical reactions take place, the gasket allowing enough space between plates to allow for the thickness of the metal deposit and any projections the deposit may build,
   d) A stationary press head at one end of the support bars provided with at least one port for liquid inlet into the cell and one port for the liquid outlet from the cell, said stationary head electrically insulated from any power supply and firmly attached to the support bars,
   e) A displaceable or follower press head opposite to the stationary press head resting over two horizontal support bars, and provided with a port for liquid inlet into the cell and a port for the liquid outlet from the cell, said follower press head electrically insulated from any power supply,
   f) A support bracket that holds the support bars at the opposite end from the stationary press head and that also supports a hydraulic press, said support bracket electrically insulated from any power supply,
   g) A hydraulic press fixed to the support bracket to compress the pack of plates and gaskets between the follower press head and the stationary press head by pushing the follower press head against the pack of plates and gaskets, said hydraulic press electrically insulated from any power supply.

2. A method for wastewater treatment and metals recovery by electrolysis using the electrolytic cell of claim 1 comprising:
   a) Flowing the liquid through a filter press type electrolytic cell having the horizontal parallel bars, electrode plates, split chamber intricate flow channel-containing gaskets, stationary press head, follower press head, support bracket and hydraulic press as recited in claim 1,
   b) Impressing an electrical current flow through the liquids flowing through the cell by means of anodes and cathodes in contact with the liquids, inducing the chemical and physicochemical reactions to separate and partially decompose organic and inorganic matter from the liquids treated and electrowin the metal or metals in solution,
   c) Injecting reagents into the cell to assist the reactions,
   d) Venting the gases generated,
   e) Opening the cell periodically to scrape off the metal plated inside of the apparatus over cathode plates,
   f) Separating suspended metal particles from the liquid exiting the cell.

3. The electrolytic cell of claim 1 whereas plates, gaskets and permeable barriers are arranged to have two or more liquids circulating separately and simultaneously through the apparatus.

4. The electrolytic cell of claim 1 whereas the plates have spikes to favor localized plating of the metal or metals to be recovered over the spikes' tips.

5. The electrolytic cell of claim 1 whereas the plates' surfaces are made corrugated to increase the turbulence of the liquid as it flows through the chambers.

6. The electrolytic cell of claim 1, whereas the electrical current is set to flow in series through a group of chambers in the apparatus by connecting the first electrode plate of said group of chambers with the positive terminal of a direct electrical current supply and connecting the last electrode plate of said group of chambers with the negative terminal of a direct electrical current supply, each electrode plate in said group of chambers acting as an anode on one face and as a cathode on the opposite face.

7. The electrolytic cell of claim 1, whereas the electrical current is set to flow in parallel through a group of chambers in the apparatus by means of connecting the positive terminal of a direct electrical current supply to every other electrode plate in said group of chambers making said plates act as anodes and connecting the negative terminal of a direct electrical current supply to each of the remaining electrode plates in said group of chambers making said plates act as cathodes.

8. The electrolytic cell of claim 1, whereas any chamber is further subdivided into an anodic chamber and a cathodic chamber by means of a permeable barrier that allows a limited transport of chemical species from one side of the permeable barrier to the other.

9. The electrolytic cell of claim 1, whereas each gasket pressed between plates or between a plate and a permeable barrier forms a chamber made of one or more flow channels of intricate flow path between the inlet and the outlet of said chamber.

10. The electrolytic cell of claim 1, whereas one or more gaskets are equipped with gas venting or reagent injection ports.

11. The electrolytic cell of claim 1, whereas the liquid or liquids are set to flow in parallel through a group of chambers in the apparatus.

12. The electrolytic cell of claim 1, whereas a liquid is set to flow in series through a group of chambers in the apparatus as follows:
   a) The liquid enters a chamber formed by a gasket pressed between two electrode plates,
   b) The liquid flows through said chamber to exit into another chamber formed by a gasket pressed between another set of electrode plates,
   c) This pattern repeated from one end of said group of chambers to the other.

13. The electrolytic cell of claim 1, whereas the electrode plates are made of a base material with a coating of an electricity conducting material.

14. The electrolytic cell of claim 1, whereas the electrodes are framed with a non-conductive material to act as gasket and with holes or openings to convey the liquids, reagents and gases in and out of the electrolysis chambers and in and out of the apparatus without the need for liquid and gas flow openings in the electrode plates themselves.

15. The electrolytic cell of claim 1, whereas electricity is supplied to individual electrode plates by means of attaching individual electrical connectors to each of them.

16. The electrolytic cell of claim 1, whereas electricity is supplied to individual electrode plates by means of making contact with a bus bar.

17. The electrolytic cell of claim 1, whereas one or more plates are made of a sacrificial material intended to dissolve into a liquid flowing through the cell.

18. The electrolytic cell of claim 1, whereas the electrode plates are hung from a top rail.

19. The method of claim 2 whereas the electricity flowing through the electrolytic cell is DC, AC, pulsing, reversing or a combination thereof.

20. The method of claim 2 whereas the liquid flow and direction of flow through the cell is varied to change the conditions influencing the liquid constituents separation process and the metals electrowinning process.

\* \* \* \* \*